(12) United States Patent
Yamasaki et al.

(10) Patent No.: US 12,541,926 B2
(45) Date of Patent: Feb. 3, 2026

(54) INFORMATION PROCESSING APPARATUS AND METHOD

(71) Applicant: Panasonic Intellectual Property Management Co., Ltd., Osaka (JP)

(72) Inventors: Takaaki Yamasaki, Osaka (JP); Shinichi Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/431,942

(22) Filed: Feb. 3, 2024

(65) Prior Publication Data

US 2024/0265639 A1 Aug. 8, 2024

(30) Foreign Application Priority Data

Feb. 7, 2023 (JP) .................................. 2023-016833
Feb. 7, 2023 (JP) .................................. 2023-016837

(51) Int. Cl.
*G06T 19/00* (2011.01)
*G06F 3/01* (2006.01)
*H04S 7/00* (2006.01)

(52) U.S. Cl.
CPC ............ *G06T 19/003* (2013.01); *G06F 3/013* (2013.01); *H04S 7/303* (2013.01); *G06T 2200/24* (2013.01); *G06T 2219/024* (2013.01); *H04S 2400/11* (2013.01); *H04S 2400/13* (2013.01)

(58) Field of Classification Search
CPC .................................................. G06T 19/006
See application file for complete search history.

(56) References Cited

U.S. PATENT DOCUMENTS

| | | | |
|---|---|---|---|
| 2007/0082742 A1 | 4/2007 | Takizawa et al. | |
| 2009/0177977 A1 | 7/2009 | Jones et al. | |
| 2010/0287510 A1* | 11/2010 | Cragun | G09B 21/00 |
| | | | 715/848 |
| 2011/0302509 A1* | 12/2011 | Leacock | H04L 67/142 |
| | | | 715/756 |
| 2014/0306952 A1* | 10/2014 | Oka | G06T 15/10 |
| | | | 345/419 |
| 2014/0316192 A1* | 10/2014 | de Zambotti | A61B 5/486 |
| | | | 600/27 |
| 2014/0354631 A1 | 12/2014 | Yamaoka | |

(Continued)

FOREIGN PATENT DOCUMENTS

| | | |
|---|---|---|
| JP | H10-055261 A | 2/1998 |
| JP | 2000-322594 A | 11/2000 |

(Continued)

*Primary Examiner* — Nan-Ying Yang
(74) *Attorney, Agent, or Firm* — Renner, Otto, Boisselle & Sklar, LLP

(57) ABSTRACT

An information processing apparatus causes a display to display an image obtained in a virtual space, the display being provided for a user, the virtual space being configured to allow an avatar indicating the user to move. The information processing apparatus includes: an input interface that receives a user operation to set a specific object as a target for predetermined image processing, among objects arranged in the virtual space; and a controller that causes the display to display a processed image obtained by applying the image processing to the specific object in the virtual space, based on the user operation.

20 Claims, 13 Drawing Sheets

(56) References Cited

U.S. PATENT DOCUMENTS

| | | | |
|---|---|---|---|
| 2015/0113084 A1* | 4/2015 | Kimura | G06Q 10/107 |
| | | | 709/206 |
| 2015/0260990 A1* | 9/2015 | Ueno | G09G 3/003 |
| | | | 345/419 |
| 2018/0015362 A1 | 1/2018 | Terahata | |
| 2019/0222798 A1* | 7/2019 | Honma | G10L 19/00 |
| 2020/0035039 A1 | 1/2020 | Adachi | |
| 2020/0193559 A1* | 6/2020 | Sano | G06F 3/14 |
| 2022/0036758 A1* | 2/2022 | Oh | G06T 19/006 |
| 2022/0044462 A1 | 2/2022 | Kondoh et al. | |
| 2022/0414991 A1 | 12/2022 | Ishikawa | |
| 2024/0144571 A1* | 5/2024 | Zavesky | G06F 3/011 |

FOREIGN PATENT DOCUMENTS

| | | |
|---|---|---|
| JP | 2007-108876 A | 4/2007 |
| JP | 2008-301230 A | 12/2008 |
| JP | 2009-163745 A | 7/2009 |
| JP | 2012-150278 A | 8/2012 |
| JP | 2014-235657 A | 12/2014 |
| JP | 2015-150215 A | 8/2015 |
| JP | 2018-010480 A | 1/2018 |
| JP | 2020-017061 A | 1/2020 |
| JP | 2022-025476 A | 2/2022 |
| WO | 2021/131991 A1 | 7/2021 |

* cited by examiner

INSIDE THE GROUP

OUTSIDE THE GROUP

INFORMATION PROCESSING APPARATUS AND METHOD

TECHNICAL FIELD

The present disclosure relates to an information processing apparatus, an information processing method, and a program that perform information processing regarding a virtual space.

BACKGROUND ART

The JP 2000-322594 A discloses an image display method for displaying a computer graphics image representing a three-dimensional virtual space. This image display method sets an element for changing a depth of field with respect to a camera installed in a three-dimensional virtual space, and calculates a blur amount with respect to an object on the basis of the element for changing the set depth of field and the object to be displayed in a computer graphics image. In this way, the present method performs image processing of expressing a predetermined blur in an object not included in the range of the depth of field according to the depth of field set in the three-dimensional virtual space, thereby enabling expression similar to that of a live-action video captured by the camera.

SUMMARY

The present disclosure provides an information processing apparatus and a method capable of facilitating to obtain an image and/or sound according to a user's intention in a virtual space.

An aspect according to the present disclosure is an information processing apparatus for causing a display to display an image obtained in a virtual space, the display being provided for a user, the virtual space being configured to allow an avatar indicating the user to move, the information processing apparatus including: an input interface that receives a user operation to set a specific object as a target for predetermined image processing, among objects arranged in the virtual space; and a controller that causes the display to display a processed image obtained by applying the image processing to the specific object in the virtual space, based on the user operation.

Another aspect according to the present disclosure is an information processing apparatus for causing an output interface to output sound obtained in a virtual space, the output interface being provided for a user, the virtual space being configured to allow an avatar indicating the user to move, the information processing apparatus including: an input interface that receives a user operation to set a specific object as a target for predetermined audio processing, among objects arranged in the virtual space; and a controller that causes the output interface to output processed sound obtained by applying the audio processing to sound emitted from the specific object in the virtual space, based on the user operation.

These general and specific aspects may be implemented by a system, a method, and a computer program, and a combination thereof.

According to the information processing apparatus and the method of the present disclosure, it is possible to facilitate to obtain an image and/or sound according to a user's intention in a virtual space.

DETAILED DESCRIPTION

Hereinafter, a detailed description of an embodiment will be given with reference to drawings as appropriate. However, detailed description of already well-known matters and redundant description of substantially the same configuration may be omitted. Note that the accompanying drawings and the following description are provided for those skilled in the art to fully understand the present disclosure, and are not intended to limit the subject matter described in the claims.

First Embodiment

1. Configuration 1-1. System Overview

A virtual space system according to a first embodiment of the present disclosure will be described with reference to FIG. 1.

Figure 1:
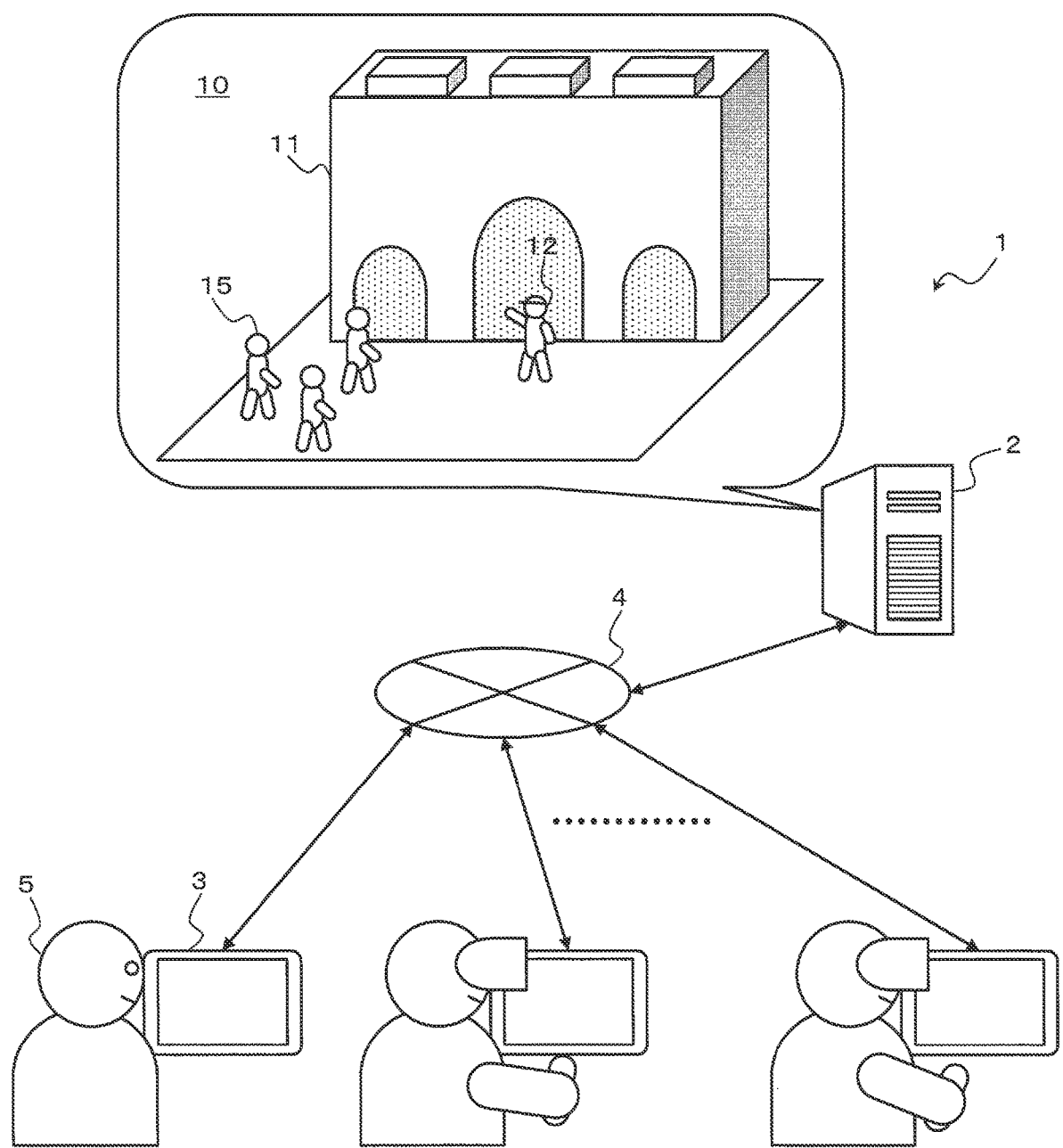
FIG. 1 is a diagram for explaining a virtual space system according to a first embodiment of the present disclosure.

The virtual space system 1 according to the present embodiment includes, for example, a virtual space server 2 and a plurality of personal terminals 3 as illustrated in FIG. 1. The present system 1 is applied to an application in which a user 5 obtains a desired experience through his/her own avatar 15 in a virtual space 10 such as a metaverse. The avatar 15 is an example of an object indicating an individual such as the user himself/herself in the virtual space 10.

In the present system 1, the virtual space server 2 and each personal terminal 3 are connected to be able to perform data communication via a communication network 4 such as the Internet. The virtual space server 2 executes various information processing (e.g., image processing and audio processing) for realizing the experience of each user in the virtual space 10. The personal terminals 3 are used, for example, for different users 5 to operate their own avatars 15 in the virtual space 10 or to view the experience. The user 5 may use a head mounted display (HMD), a hand controller, and the like in communication connection with the personal terminal 3, or may experience the virtual space 10 by viewing with the personal terminal 3 alone. The HMD or the like may constitute the personal terminal 3.

1-2. Server Configuration

A configuration of the virtual space server 2 in the present embodiment will be described with reference to FIG. 2.

Figure 2:
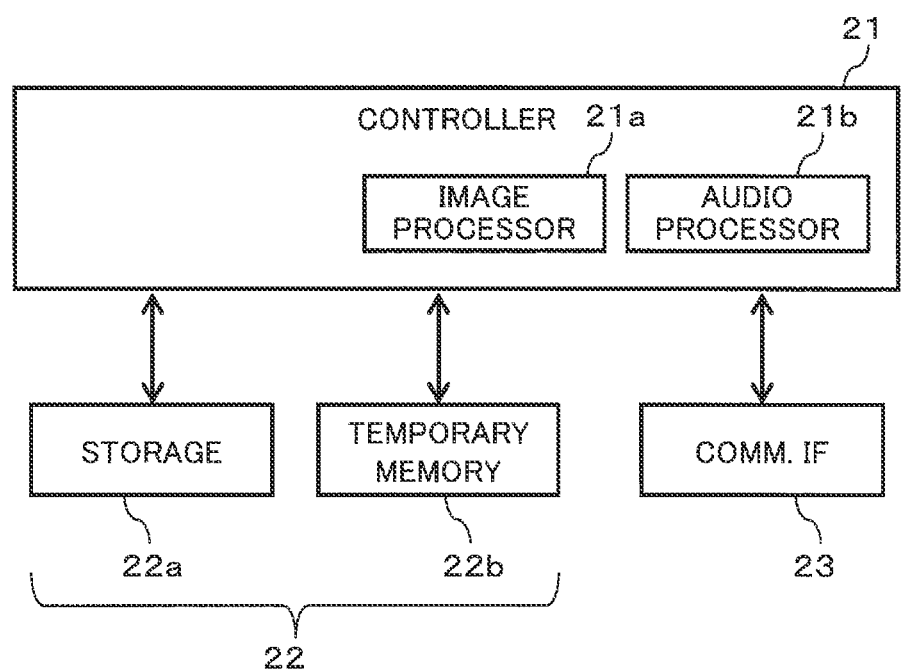
FIG. 2 is a diagram illustrating a configuration of a virtual space server according to the first embodiment.

FIG. 2 is a diagram illustrating a configuration of the virtual space server 2. The virtual space server 2 is an example of an information processing apparatus including, for example, one or a plurality of computers. The virtual space server 2 illustrated in FIG. 2 includes a controller 21, a memory 22, and a communication interface 23.

The controller 21 includes, for example, a CPU, a GPU, or the like that implements a predetermined function in cooperation with software, and controls the operation of the virtual space server 2. The controller 21 reads data and programs stored in the memory 22, performs various arithmetic processing, and implements various functions.

For example, the controller 21 includes an image processor 21a and an audio processor 21b as a functional configuration of the virtual space server 2. The image processor 21a executes various image processing for generating various images in the virtual space 10. The audio processor 21b executes various audio processing for generating various sounds in the virtual space 10. The controller 21 executes, for example, a program including a command group for implementing each of the above-described functions. The above program may be provided from a communication network such as the Internet, or may be stored in a portable recording medium.

The controller 21 may be a hardware circuit such as a dedicated electronic circuit or a reconfigurable electronic circuit designed to implement each of the above-described functions. The controller 21 may include various semiconductor integrated circuits such as a CPU, an MPU, a GPU, a GPGPU, a TPU, a microcomputer, a DSP, an FPGA, and an ASIC. Each of the image processor 21a and the audio processor 21b may be configured by a dedicated circuit.

The memory 22 is a storage medium that stores programs and data necessary for implementing the functions of the virtual space server 2. As illustrated in FIG. 2, the memory 22 includes a storage 22a and a temporary memory 22b.

The storage 22a stores parameters, data, control programs, and the like for implementing a predetermined function. The storage 22a includes, for example, an HDD or an SSD. For example, the storage 22a stores the above-described program, various image data, and the like.

The temporary memory 22b includes, for example, a RAM such as a DRAM or an SRAM, and temporarily stores (i.e., holds) data. For example, the temporary memory 22b holds image data that is being edited. The temporary memory 22b may function as a work area of the controller 21, and may be configured by a storage area in an internal memory of the controller 21.

The communication interface 23 is a module (circuit) that connects to an external apparatus according to a predetermined communication standard in wired or wireless communication. The predetermined communication standard includes, for example, IEEE 802.3, IEEE 802.11a/11b/11g/11ac/11ax, USB, HDMI (registered trademark), IEEE 1394, Wi-Fi, Bluetooth, and the like. The communication interface 23 may 23 may connect the virtual space server 2 to a communication network such as the Internet. The communication interface 23 is an example of an input interface that receives various information from an external apparatus or a communication network.

1-3. Configuration of Personal Terminal

A configuration of the personal terminal 3 in the present embodiment will be described with reference to FIG. 3.

Figure 3:
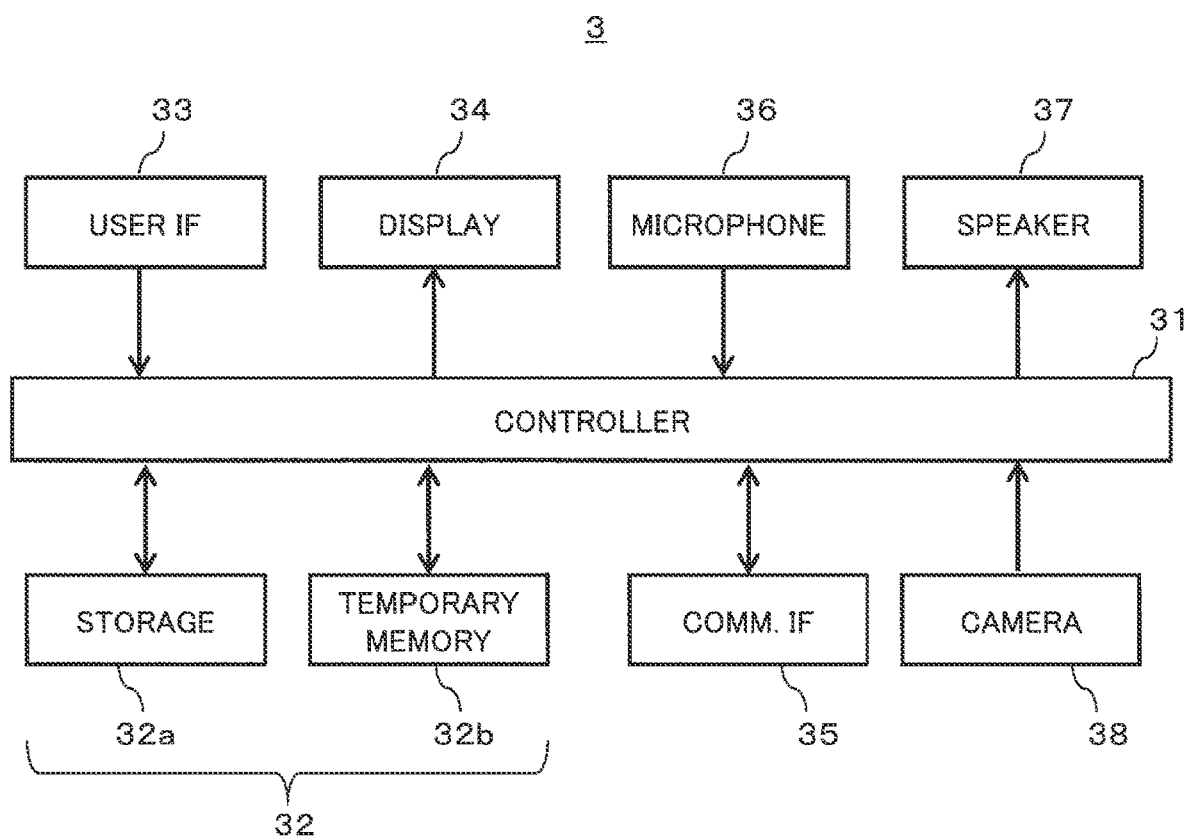
FIG. 3 is a diagram illustrating a configuration of a personal terminal according to the first embodiment.

FIG. 3 is a diagram illustrating a configuration of the personal terminal 3. The personal terminal 3 is an example of an information processing apparatus including, for example, a personal computer, a smartphone, a tablet terminal, a wearable terminal, or the like. The personal terminal 3 illustrated in FIG. 3 includes a controller 31, a memory 32, a user interface 33, a display 34, a communication interface 35, a microphone 36, a speaker 37, and a camera 38.

The controller 31 includes, for example, a CPU or an MPU that implements a predetermined function in cooperation with software. The controller 31 controls, for example, the entire operation of the personal terminal 3. The controller 31 reads data and programs stored in the memory 32, performs various arithmetic processing, and implements various functions.

The controller 31 executes, for example, a program including a command group for implementing each of the above-described functions. The above program may be provided from a communication network such as the Internet, or may be stored in a portable recording medium. The controller 31 may be a hardware circuit such as a dedicated electronic circuit or a reconfigurable electronic circuit designed to implement each of the above-described functions. The controller 31 may include various semiconductor integrated circuits such as a CPU, an MPU, a GPU, a GPGPU, a TPU, a microcomputer, a DSP, an FPGA, and an ASIC.

The memory 32 is a storage medium that stores a program and data necessary for implementing the function of the personal terminal 3. As illustrated in FIG. 3, the memory 32 includes a storage 32a and a temporary memory 32b.

The storage 32a stores parameters, data, control programs, and the like for implementing a predetermined function. The storage 32a includes, for example, an HDD or an SSD. For example, the storage 32a stores the above-described program, various image data, audio data, and the like.

The temporary memory 32b includes, for example, a RAM such as a DRAM or an SRAM, and temporarily stores (i.e., holds) data. For example, the temporary memory 32b holds image data, audio data, and the like. The temporary memory 32b may function as a work area of the controller 31, and may be configured by a storage area in an internal memory of the controller 31.

The user interface 33 is a general term for operation members operated by a user. The user interface 33 may be, for example, a keyboard, a mouse, a touch pad, a touch panel, a button, a switch, or the like. The user interface 33 also includes various GUIs such as virtual buttons, icons, cursors, and objects displayed on the display 34. The user interface 33 is an example of an input interface in the personal terminal 3. The input interface may be an interface circuit that inputs a user operation from an external operation member such as a hand controller.

The display 34 is an example of an output interface including, for example, a liquid crystal display or an organic EL display. The display 34 may display various information such as various GUIs for operating the user interface 33 and information input from the user interface 33.

The communication interface 35 is a module (circuit) that connects to an external apparatus according to a predetermined communication standard in wired or wireless communication. The predetermined communication standard includes, for example, USB, HDMI, IEEE 802.11, Wi-Fi, Bluetooth, and the like. The communication interface 35 may connect the personal terminal 3 to a communication network such as the Internet. The communication interface 35 is an example of an acquisition unit that receives various information from an external apparatus or a communication network.

The microphone 36 is an example of a detector that includes, for example, one or more microphone elements built in the personal terminal 3 and collects sound outside the personal terminal 3. The microphone 36 outputs an audio signal indicating the collected sound to the controller 31. In the personal terminal 3, an external microphone may be used. Alternatively or additionally to the built-in microphone 36, the personal terminal 3 may include a connector such as a terminal connected to an external microphone as a detector.

The speaker 37 is an example of an output interface that includes, for example, one or more speaker elements built in the personal terminal 3 and outputs sound to the outside of the personal terminal 3 under the control of the controller 31. In the personal terminal 3, an external speaker, an earphone, or the like may be used. Alternatively or additionally to the built-in speaker 37, the personal terminal 3 may include, as an output interface, a connector connected to an external speaker or the like.

The camera 38 is disposed, for example, at a position where a user's face or the like viewing the display 34 can be imaged in the personal terminal 3, and includes an imaging element, an optical system, and the like. The camera 38 is, for example, a visible light camera capable of imaging in a wavelength band of a visible region. Additionally or alternatively, the camera 38 may be an infrared light camera capable of imaging in a wavelength band of an infrared region. In this case, the personal terminal 3 may further include an infrared light source as a light source for imaging of the camera 38.

The configuration of the personal terminal 3 as described above is an example, and the configuration of the personal terminal 3 is not limited thereto. For example, the acquisition unit in the personal terminal 3 may be realized by cooperation with various kinds of software in the controller 31 or the like. The input interface in the personal terminal 3 may acquire various information by reading various information stored in various storage media (e.g., the storage 32a) to a work area (e.g., the temporary memory 32b) of the controller 31.

For the display 34 of the personal terminal 3, various display devices such as an HMD and a projector may be used. In a case where an external display device is used, the display 34 of the personal terminal 3 may be, for example, an output interface circuit for a video signal conforming to the HDMI standard or the like, for example.

2. Operation

The operation of the virtual space system 1 of the present embodiment configured as described above will be described below.

The present system 1 provides a travel to visit various places in the virtual space 10 such as a metaverse, that is, a metaverse travel, by the user 5 operating the avatar 15. An outline of the operation of the present system 1 will be described with reference to FIG. 1.

In the present system 1, as illustrated in FIG. 1, a virtual tourist spot 11 is configured by arranging various three-dimensional objects at specific places in the virtual space 10, for example, so as to reproduce a real tourist spot. The metaverse travel can be set as, for example, an experience of going around various real tourist spots 11 in the world in the virtual space 10.

In FIG. 1, in the metaverse travel in the virtual space 10, avatars 15 of a plurality of users 5 are guided to a tourist spot 11 by a guide 12. The guide 12 is, for example, an object that serves as a guide of the metaverse travel, and is, for example, an avatar of a user who serves as a guide. The user 5 may participate in the metaverse travel individually, or may participate in a group including a plurality of users.

The present system 1 enables a plurality of users 5 to share an experience such as a metaverse travel in the virtual space 10 by data communication between a plurality of personal terminals 3 and the virtual space server 2. Each of the personal terminals 3 inputs various operations of the user 5 on the user interface 33, collects the voice of the user 5 from the microphone 36, and transmits the obtained various input information to the virtual space server 2.

The virtual space server 2 generates various images and sounds in the virtual space 10 by the image processor 21a and the audio processor 21b on the basis of the input information received from each personal terminal 3, and transmits data indicating the generated images and sounds to each personal terminal 3. Each of the personal terminals 3 displays an image of the virtual space 10 on the display 34 or outputs sound from the speaker 37 on the basis of the data received from the virtual space server 2.

2-1. Reception Processing of Metaverse Travel

The present system 1, for example, receives an application for the user to participate in the metaverse travel before performing the metaverse travel as described above, and performs pre-setting according to a request of the user. The reception processing of the metaverse travel in the present embodiment will be described with reference to FIGS. 4 to 5.

Figure 4:
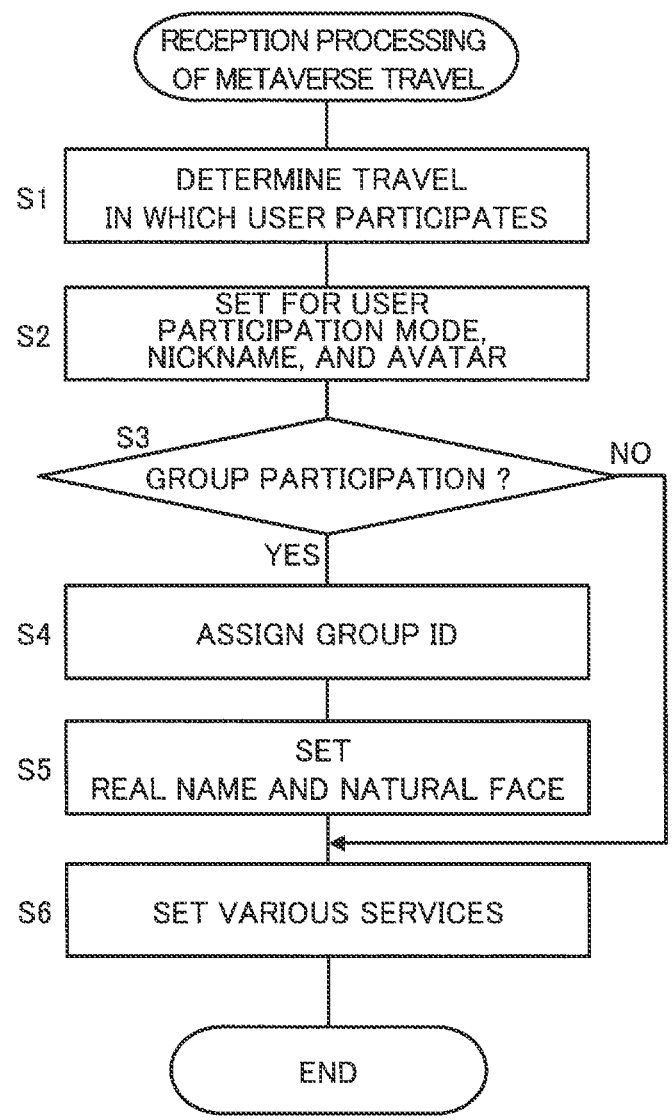
FIG. 4 is a flowchart illustrating reception processing of a metaverse travel in the virtual space system.
Figure 5:
FIG. 5 is a diagram illustrating a reception screen of a metaverse travel in the virtual space system.

FIG. 4 is a flowchart illustrating reception processing of metaverse travel in the present system 1. FIG. 5 is a diagram illustrating a reception screen of the metaverse travel in the present system 1. The flow illustrated in FIG. 4 is executed by, for example, the controller 21 of the virtual space server 2. The reception screen illustrated in FIG. 5 is displayed on the display 34 of the personal terminal 3, for example, during execution of the flow of FIG. 4. Hereinafter, a processing example when the user who is the manager of the group applies for the metaverse travel will be described.

First, for example, the controller 21 of the virtual space server 2 determines a travel in which the user participates, according to the information of the user operation received from the personal terminal 3 (S1). For example, as illustrated in FIG. 5, on a reception screen displayed on the display 34 of the personal terminal 3, the user inputs, to the user interface 33, a user operation of selecting a desired travel name from among various travel names prepared in advance. The controller 31 of the personal terminal 3 transmits the selection result by the user operation to the virtual space server 2 via the communication interface 23 (S1).

The controller 21 sets the participation mode of the user, the nickname, and the avatar on the basis of the user operation on the personal terminal 3 (S2). In the present system 1, as illustrated in FIG. 5, the user can select "individual" or "group" as the mode of participating in the metaverse travel. The user can input a desired nickname or designate various avatar appearances on the user interface 33 of the personal terminal 3, for example. Such input information of the user operation is transmitted from the personal terminal 3 to the virtual space server 2 (S2).

For example, in a case where the participation mode of the user is "group" (YES in S3), the controller 21 of the virtual space server 2 assigns a group ID for identifying whether or not the user is a member of the group and a member ID for identifying each member in the group (S4).

Further, the controller 21 receives the setting of a "real name" and a "natural face" via the personal terminal 3 for the user whose participation mode is the group (S5). The "real name" is a name that can be set separately from the nickname (S2), and can be made unknown to other than the members of the group together with the "natural face". The "natural face" is an appearance that can be set separately from the avatar appearance set in step S2, and for example, a photographed image or a 3D scanned image of the user can be used. Such information is also transmitted from the personal terminal 3 to the virtual space server 2 in the same manner as described above (S5).

On the other hand, when the participation mode of the user is the "individual" and is not the "group" (NO in S3), the controller 21 proceeds to step S6 without performing the processing of steps S4 and S5. In this case, the controller 21 may assign a personal ID for identifying an individual user instead of step S4.

Next, the controller 21 receives settings of various services in the metaverse travel via the personal terminal 3 (S6). In the present system 1, for example, as illustrated in FIG. 5, a guide service, a group service, an individual photographing service, a warp movement service, and a voice conversion service are provided. Various services will be described later. When the user inputs, for example, a user operation for enabling a desired service on the personal terminal 3, the present system 1 makes a service corresponding to the user available in the metaverse travel.

The controller 21 associates the various information set in the above steps S1 to S6 with each other, stores the information in the memory 22 as reception information of the user, and ends the processing illustrated in this flow.

According to the reception processing of the metaverse travel as described above, the present system 1 can facilitate to acquire the request of the user in advance before the metaverse travel and realize the metaverse travel according to the user's intention.

Figure 6A:
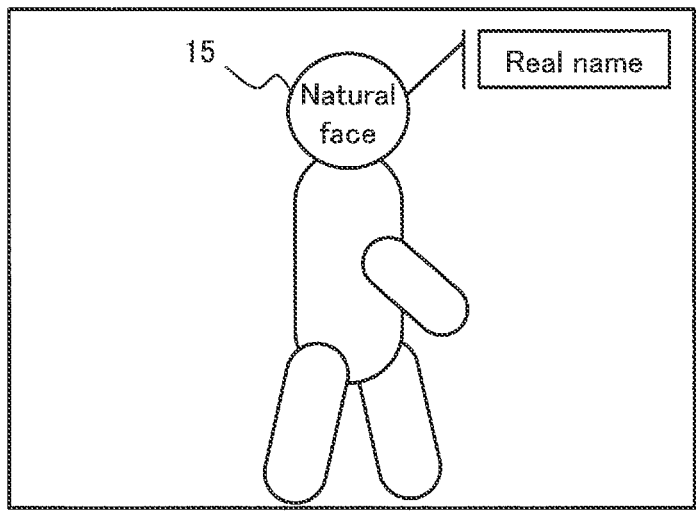
FIGS. 6A and 6B are diagrams for explaining display of avatars inside and outside a group.
Figure 6B:
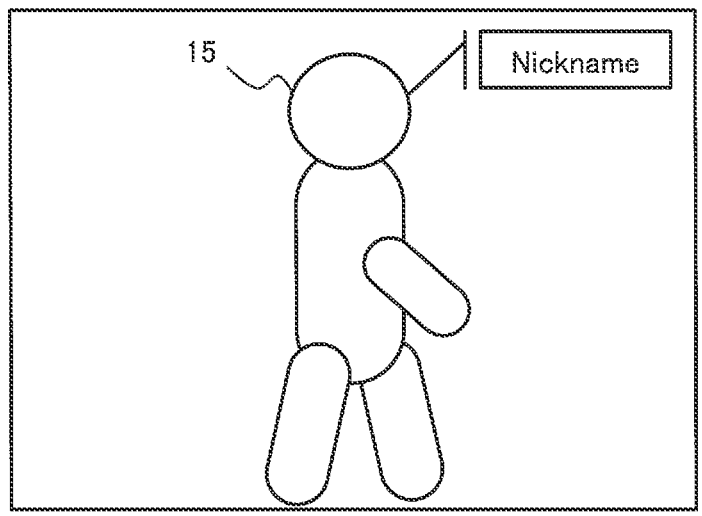

FIGS. 6A and 6B are diagrams for explaining display of avatars 15 inside and outside the group in the present system 1. For example, on the basis of the reception information set as described above, the virtual space server 2 of the present system 1 switches the name displayed on the avatar 15 of the user and the appearance of the avatar 15 between inside and outside of the group.

For example, in the live view on the display 34 of the personal terminal 3 of the member of the same group as the user, as illustrated in FIG. 6A, the real name set in step S5 is displayed on the avatar 15 of the user. Furthermore, the avatar 15 of the user is displayed as a natural face.

On the other hand, in the live view on the personal terminal 3 other than the members of the group of users, as illustrated in FIG. 6B, the nickname is displayed on the avatar 15 of the user. Furthermore, the avatar 15 of the user is displayed in the appearance set in step S2.

As described above, by switching the information displayed on the avatar 15 inside and outside the group, it is possible to secure privacy when the user participates in the metaverse travel as a group and to facilitate to have experience on the virtual space 10 such as the metaverse travel.

2-2. Operation During Metaverse Travel

An operation of the present system 1 at the time of performing a metaverse travel on the basis of the reception information set as described above will be described with reference to FIGS. 7 to 8.

Figure 7:
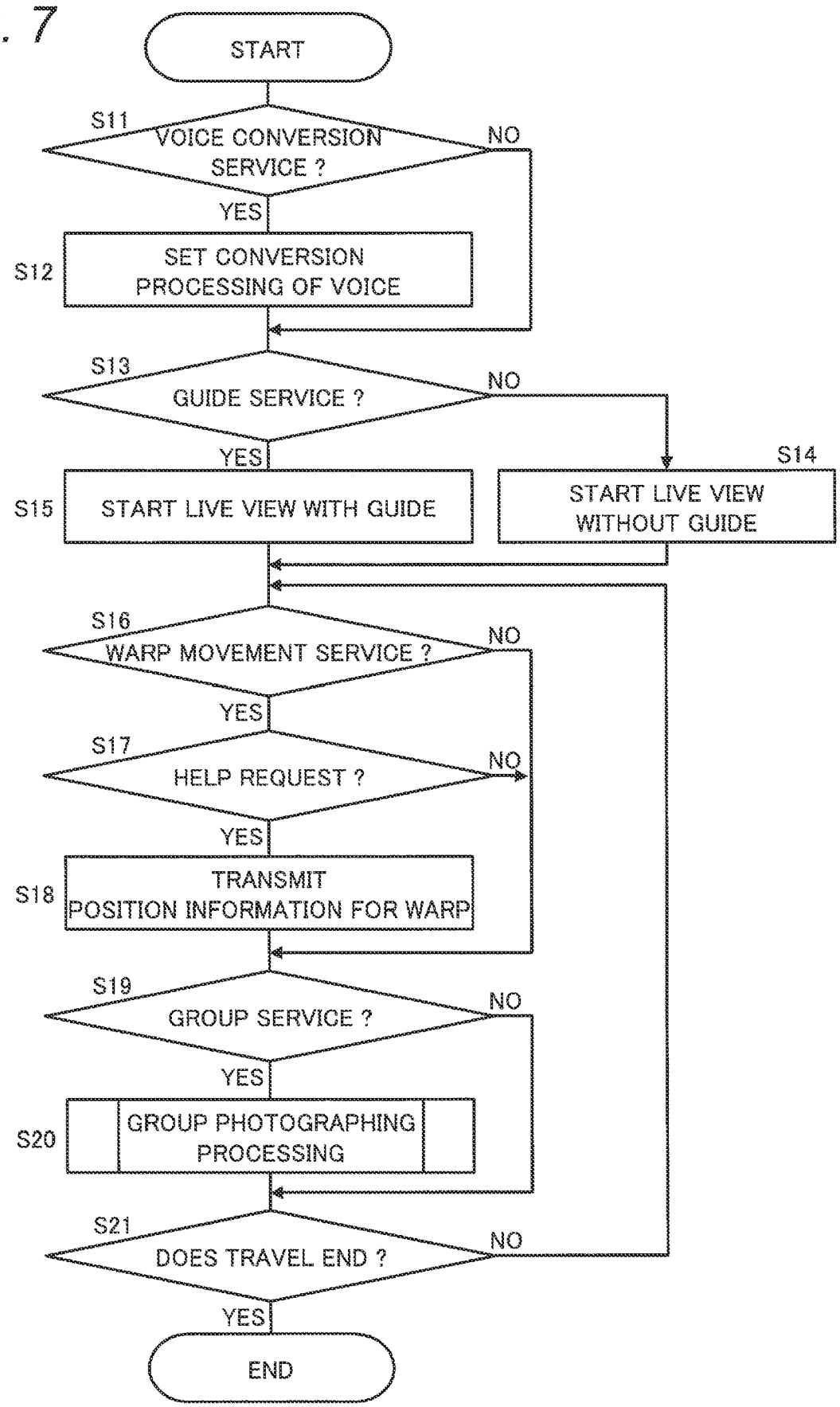
FIG. 7 is a flowchart illustrating an operation during a metaverse travel in the virtual space system.
Figure 8A:
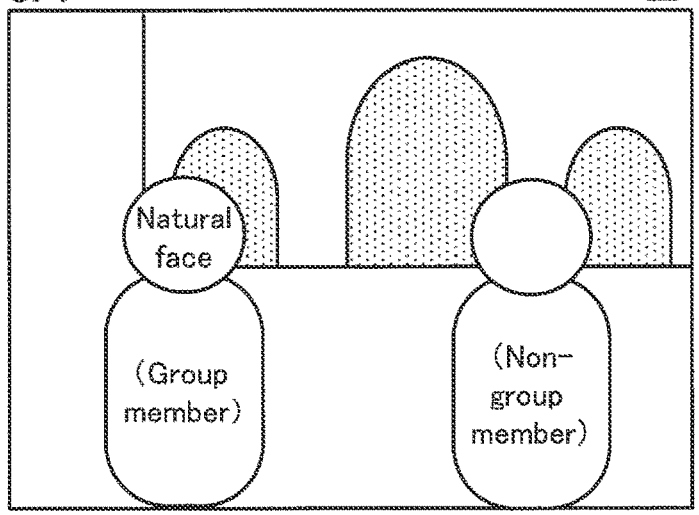
FIGS. 8A to 8C are diagrams for explaining a live view in the virtual space system.
Figure 8B:
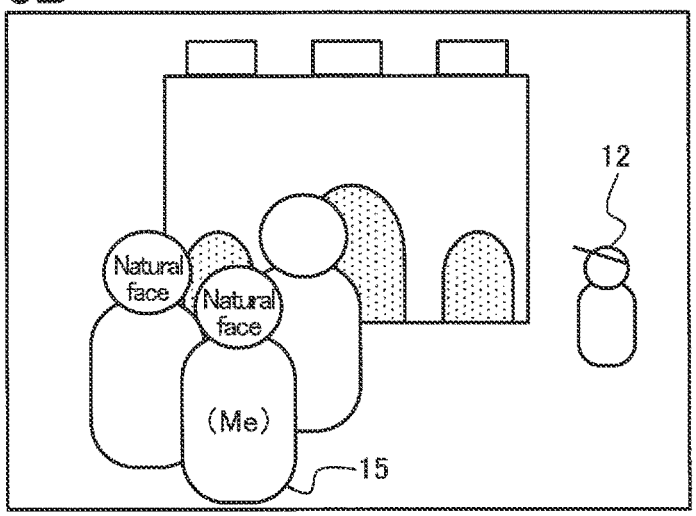
Figure 8C:
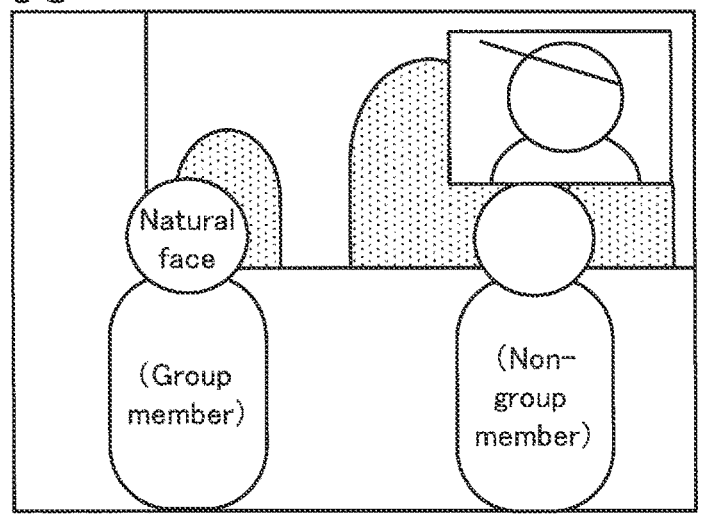

FIG. 7 is a flowchart illustrating an operation during a metaverse travel in the present system 1. FIGS. 8A to 8C area diagrams for describing a live view in the present system 1.

The processing illustrated in FIG. 7 is started, for example, when the user starts the metaverse travel in the present system 1. In FIG. 7, for example, processing executed by the virtual space server 2 during the user's metaverse travel with respect to an input from the personal terminal 3 of a specific user will be described.

In the present system 1, for example, the controller 21 of the virtual space server 2 determines whether or not the voice conversion service is ON (valid) for the user on the basis of the reception information managed for each user in the memory 22 (S11). The voice conversion service is a service that converts characteristic, volume, and the like of a voice of the user himself/herself or another person in accordance with a request of the user.

For example, as illustrated in FIG. 5, the user can select one or both of "avatar voice characteristic" and "volume optimization" as the voice conversion service. When the voice conversion service is ON (YES in S11), the controller 21 sets the conversion processing of voice according to the user's selection in the audio processor 21b (S12). On the other hand, when the voice conversion service is not ON but OFF (invalid) (NO in S11), the processing of step S12 is not performed.

The "avatar voice characteristic" is a voice conversion service that changes the voice characteristic of the user's voice in accordance with, for example, the gender, the age, and the like of the user's avatar appearance. For example, in a case where the male user uses the female avatar, the controller 21 sets, in the audio processor 21b, audio processing for converting the male voice into the female voice (S12). According to such a voice conversion service of the avatar voice characteristic, it is possible to reduce the sense of discomfort when the avatar utters the voice spoken by the user.

The "volume optimization" is, for example, a voice conversion service that optimizes the volume of the voice the user hears from the avatar of another person or optimizes the volume when the other person is made to hear the voice of the user. For example, the controller 21 sets, in the audio processor 21b, audio processing for adjusting the volume of the input/output sound according to the volume set in advance by the user (S12). For example, even in a case where the user speaks in a small voice or the distance between the avatars is long, the sound can be heard clearer.

Further, the controller 21 determines whether or not the guide service is ON on the basis of the reception information (step S13). The guide service is, for example, a service that enables viewing of information presented by the guide 12 in a live view of the personal terminal 3. For example, as illustrated in FIG. 5, the user can select one or both of the image and the sound of the guide 12.

When the guide service is OFF (NO in S13), the controller 21 starts, for example, a live view for visualizing a real-time situation in the virtual space 10 in the personal terminal 3 without particularly adding guide information (S14). On the other hand, when the guide service is ON (YES in S13), the controller 21 adds the guide information according to the user selection and starts the live view (S14). A live view of the present system 1 will be described with reference to FIGS. 8A to 8C.

FIGS. 8A and 8B illustrate the live view screen in a case where the guide information is not added (S14). In the example of FIG. 8A, the display 34 of the personal terminal 3 displays a first-person live view screen corresponding to a field of view of the user's own avatar 15. In the example of FIG. 8B, the display 34 displays a third-person live view screen corresponding to a field of view different from the field of view of the user's own avatar 15.

The present system 1 can switch live view screens of various fields of view as illustrated in FIGS. 8A and 8B, for example, when the user instructs from the user interface 33 of the personal terminal 3 during the metaverse travel. The present system 1 causes, for example, the speaker 37 of the personal terminal 3 to output various sounds having a volume according to the positional relationship of each avatar in the virtual space 10 together with such screen display.

In the live view as described above, it is conceivable that the user's own avatar 15 is not directed toward the guide 12, the guide 12 is far, or the like, so that the image of the guide 12 is not shown or the sound is difficult to hear. Therefore, the present system 1 provides a guide service capable of avoiding such a situation (FIG. 8C).

FIG. 8C illustrates a live view screen in a case where the guide information is added (S15). In the present example, since the "guide image" is selected as the guide information (FIG. 5), the controller 21 controls the image processor 21a to superimpose the image of the guide 12 on the live view screen. Additionally or alternatively, in a case where "guide sound" is selected, the controller 21 controls the audio processor 21b to maintain the volume of the guide 12 in the audio data to be output during live view. With such a guide service, the user can stably view the guide information regardless of the positional relationship with the guide 12, for example.

Returning to FIG. 7, the controller 21 determines whether or not the warp movement service is ON on the basis of the reception information (S16). The warp movement service is a service that warps and moves the avatar 15 in the virtual space 10. In the present embodiment, an example in which a warp movement service is performed using position information in a group will be described (see FIG. 5).

When the warp movement service is ON (YES in S16), the controller 21 determines whether or not a help request has been received from a certain personal terminal 3, for example, during the execution of the metaverse travel (S17). For example, in the metaverse travel, a schedule such as a time zone of going around various places is determined in advance. According to the warp movement service of the present embodiment, when the avatar 15 of the member of the group is absent at the meeting place in the schedule, for example, the user can transmit a help request for resolving the situation from the personal terminal 3 to the virtual space server 2.

When receiving a help request from a certain personal terminal 3 (YES in S17), the controller 21 of the virtual space server 2 transmits, for example, position information indicating the position of the meeting place in the schedule to the personal terminal 3 of each member of the group for warping (S18). By using such position information for warping, the member who is absent can warp and move to the meeting place indicated by the position information in the virtual space. The transmission of the position information for warping (S18) may be performed by specifying the member who is absent from the situation of the virtual space at the time of the help request.

Such transmission of the position information for warping (S18) is not particularly performed when the warp movement service is OFF (NO in S16) and when there is no help request (NO in S17).

The controller 21 determines whether or not the group service is ON on the basis of the reception information (S19). The group service is a service that makes it easy to perform moving image photographing or the like with a member of a group of users. When the group service is ON (YES in S19), the controller 21 performs the group photographing processing according to the user's selection (S20). On the other hand, when the group service is OFF (NO in S19), the group photographing processing (S20) is not performed.

For example, as illustrated in FIG. 5, the user can select one or both of "subject deletion" and "sound deletion" in the group service. In the group photographing processing (S20), avatars outside the members of the group can be collectively deleted from the moving image by "subject deletion", and sounds from avatars outside the members of the group can be collectively deleted by "sound deletion". Details of the group photographing processing (S20) of the present embodiment will be described later.

For example, the controller 21 repeatedly executes the processing of steps S16 to S20 until the metaverse travel ends (S21), and ends the processing of this flow when the metaverse travel ends.

According to the operation of the present system 1 described above, in response to the application for various services by the user, for example, in the live view and the moving image photographing during the metaverse travel, it is possible to realize the viewing experience of the image and the sound that cannot be obtained in the real world.

In steps S11 and S12 described above, the example of the voice conversion service of FIG. 5 has been described. The voice conversion service (S11, S12) of the present system 1 is not limited to the example described above, and various sound conversion processing may be set. For example, from the viewpoint of ensuring privacy, the tone of the specific avatar 15 may be changed, or the raw voice may be output by voice only within the group. Furthermore, the volume of a specific object may be changed from the viewpoint of increasing the volume of the avatar 15 to be more conspicuous or reducing the volume of a disturbing environmental sound.

The present system 1 may perform audio zoom on the avatar 15 being uttered, for example. In the virtual space 10, since the positional relationship with the avatar 15 being uttered can be accurately grasped, the audio zoom can be realized more accurately than in the real world. Furthermore, the present system 1 may provide a service for translating a speech voice of a specific avatar 15, and may output a voice of a translation result or display the voice as a subtitle.

In steps S16 to S18 described above, an example has been described in which the position information for warping is transmitted in response to the help request in the warp movement service using the position information. In the present system 1, the transmission of the position information for warping (S18) is not limited to the help request of the user, and may be automatically performed, for example, by detecting the avatar 15 who is absent in the time zone of gathering at the meeting place from the viewpoint of the schedule of the metaverse travel.

2-2-1. Group Photographing Processing

Details of the group photographing processing in step S20 of FIG. 7 will be described with reference to FIGS. 9 to 10.

Figure 9:
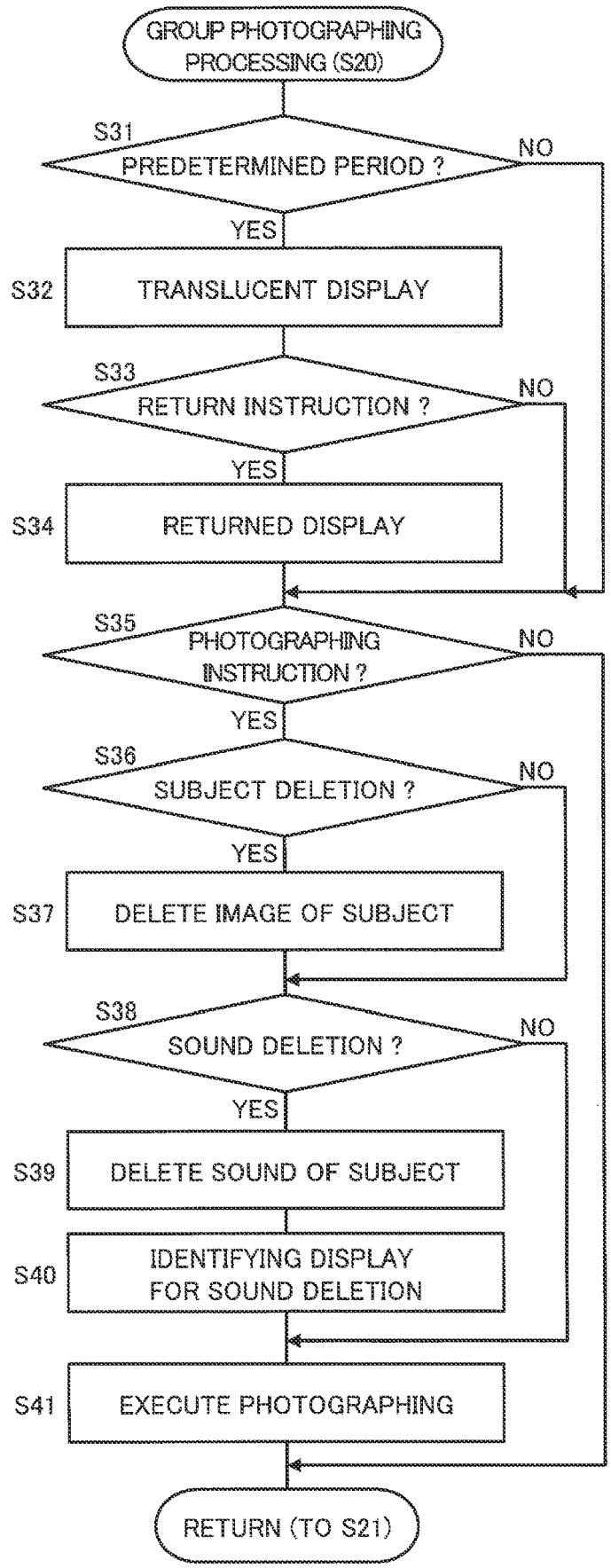
FIG. 9 is a flowchart illustrating group photographing processing in the virtual space system.

FIG. 9 is a flowchart illustrating a group photographing processing (S20) in the present system 1. FIGS. 10A to 10D illustrate a display example in the group photographing processing (S20). The processing illustrated in FIG. 9 is executed, for example, every time step S20 in FIG. 7 is repeated during the execution of the metaverse travel.

First, for example, after a predetermined period (e.g., 30 minutes) from the start of the metaverse travel (YES in S31), the controller 21 of the virtual space server 2 changes the candidate object to be deleted to a predetermined display mode such as translucency for each live view of the personal terminal 3 (S32). The display example of step S32 is illustrated in FIG. 10A.

Figure 10A:
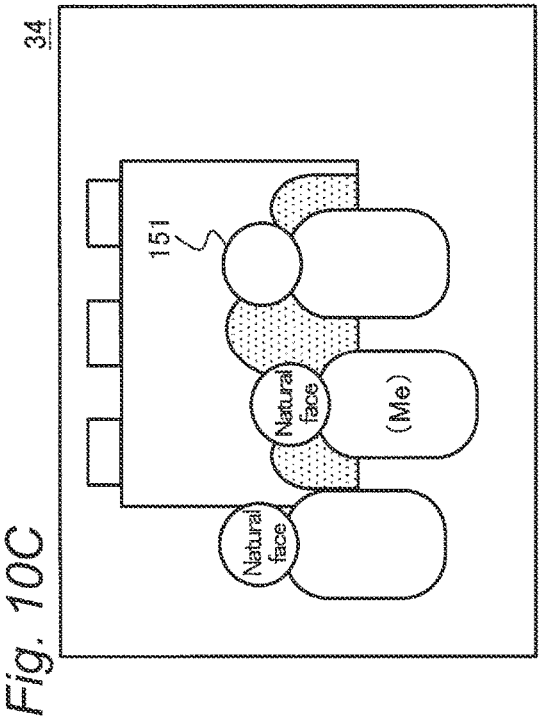
FIGS. 10A to 10D are diagrams illustrating a display example in the group photographing processing.

In the example of FIG. 10A, the controller 21 changes avatars 151 and 152 other than the members of the same group as the user to the translucent display on the basis of the group ID of the user (S32). Such translucent display is not limited to the avatar, and may be applied to various objects in the virtual space 10. The display mode of the deletion candidate is not limited to the translucent display, and various display modes may be adopted.

For example, the controller 21 determines whether or not an instruction to return from the deletion candidate is given by a user operation on the user interface 33 of the personal terminal 3 (S33). For example, when the user selects a desired avatar 151 from the avatars 151 and 152 displayed translucently on the live view screen by a touch operation or the like, the personal terminal 3 transmits a return instruction of the selected avatar 151 to the virtual space server 2 (S33). For example, at the time of such a user operation, the personal terminal 3 may perform enlarged display for making it easy for the user to select the desired avatar 151 on the live view screen.

Figure 10C:
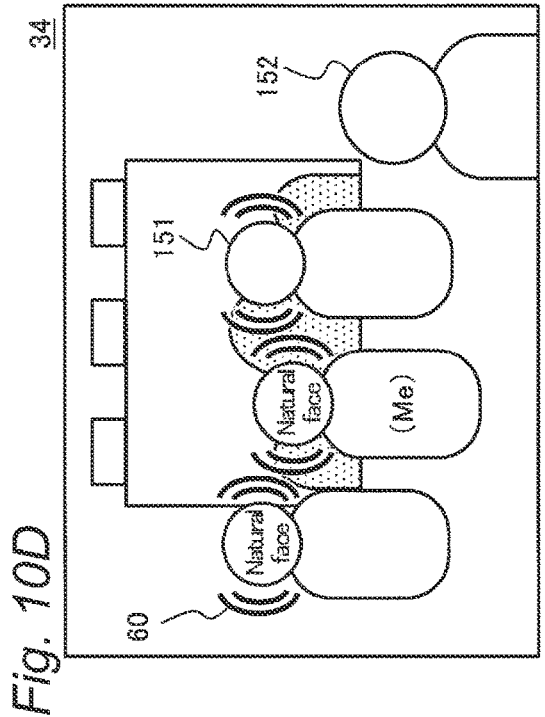
Figure 10B:
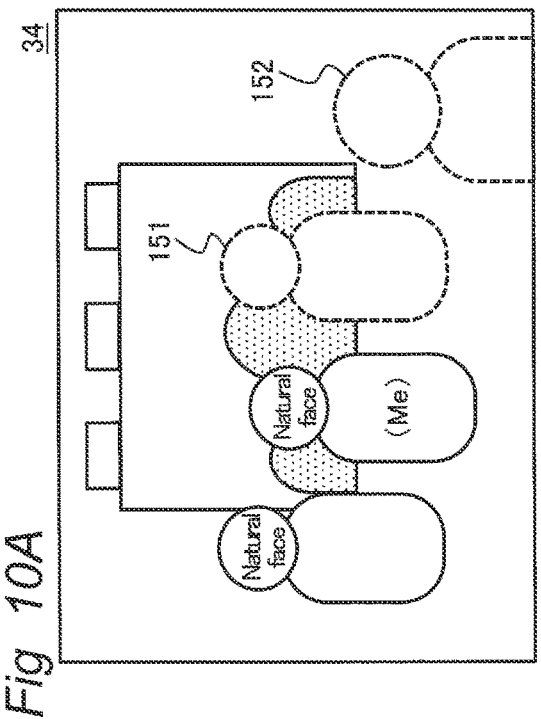

For example, when the return instruction is received from the personal terminal 3 (YES in S33), the controller 21 returns the display mode of the avatar 151 selected by the instruction in the live view of the personal terminal 3 from the translucent display to the original state, and returns the avatar 15 from the deletion candidate (S34). The display example of step S34 after FIG. 10A is illustrated in FIG. 10B.

On the other hand, when there is no return instruction in particular (NO in S33), the controller 21 proceeds to step S35 without performing the processing of step S34. For example, when receiving an instruction to start moving image photographing from the personal terminal 3 (YES in S35), the controller 21 controls the image processor 21a and the audio processor 21b for the deletion candidate as pre-preparation processing of moving image photographing (S36 to S40). The controller 21 can specify such a deletion candidate on the basis of various ID information such as a group ID (and presence or absence of a return instruction).

For example, when "subject deletion" of the group service in the reception information (FIG. 5) is ON (YES in S36), the controller 21 controls the image processor 21a to delete the avatar 152, which is a deletion candidate in the translucent display, in the photographed moving image (S37). The display example of step S37 after FIG. 10B is illustrated in FIG. 10C.

At this time, in the live view of the personal terminal 3, for example, the translucent display of the avatar 152 is switched to the transparent display. On the other hand, if "subject deletion" is OFF (NO in S36), the processing in step S37 is not performed, and the avatar 152 as a deletion candidate appears without being deleted, for example, in the photographed moving image.

Further, when the "sound deletion" of the group service in the reception information (FIG. 5) is ON (YES in S38), the controller 21 controls the audio processor 21b to delete the sound from the avatar 152 displayed translucently in the photographed moving image (S39). At this time, even in the voice output during the live view of the personal terminal 3, the voice from the avatar 152 as a target of sound deletion may be deleted.

Figure 10D:
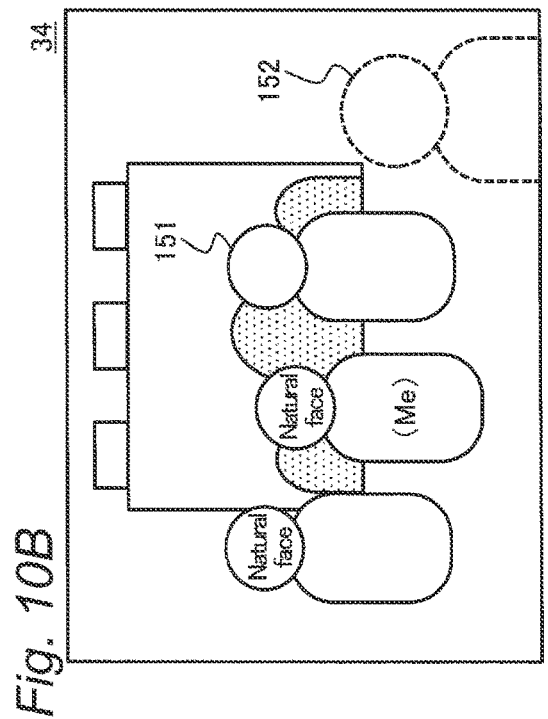

Furthermore, in the live view display of the personal terminal 3, the controller 21 performs display for identifying whether or not the various avatars 15 are processing targets of sound deletion (S40). The display example of step S40 is illustrated in FIG. 10D. In the present example, identification display is performed such that a predetermined icon 60 indicating that sound is being collected is added to the avatar 15 that is not a target of sound deletion. Such identification display is not particularly limited to the icon 60, and may be in various display modes. Furthermore, the identification display is displayed in the live view, but may not be displayed in the photographed moving image.

After performing the above preprocessing (S36 to S40), the controller 21 executes moving image photographing in the virtual space 10 (S41). Such moving image photographing is performed, for example, until completion of photographing is instructed in the personal terminal 3. The photographed moving image may be recorded in the memory 22 of the virtual space server 2 or the memory 32 of the personal terminal 3, or may be distributed via the communication network 4 or the like. For example, on the display 34 of the personal terminal 3 of the group member of the user, the moving image being photographed may be superimposed on the live view and displayed by PIP (picture-in-picture).

For example, the controller 21 ends the group photographing processing (S20 in FIG. 7) in response to the completion of the moving image photographing (S41), and proceeds to step S21.

On the other hand, when the predetermined period has not elapsed from the start of the metaverse travel (NO in S31), when the user gives the photographing instruction (YES in S35), the controller 21 performs the processing of steps S36 to S41, for example, with all the users outside the group as deletion candidates. When the photographing instruction is not particularly given (NO in S35), for example, the controller 21 ends step S20 in FIG. 7 without performing the processing in steps S36 to S41, and proceeds to step S21.

According to the group photographing processing (S20) described above, it is possible to facilitate to photograph a moving image suitable for travel in a group but difficult to photograph in the real world, such as a moving image in which others than the members of the group of the user are not intentionally shown or a moving image in which the sound is removed.

According to the translucent processing of steps S31 to S34 described above, for example, the user can perform the moving image photographing without deleting a person, who becomes familiar with other than the members of the group during the predetermined period from the start of the metaverse travel, by giving the return instruction to the person.

In the above description, an example has been described in which the translucent processing (S31 to S34) is performed after the elapse of the predetermined period from the start of the metaverse travel. The present system 1 is not limited thereto, and for example, the translucent processing (S31 to S34) may be executed in accordance with an instruction from the user or a member of the group.

The present system 1 may perform the above-described various processing during the moving image photographing in step S41. For example, the warp movement processing (S16 to S18 in FIG. 7) may be performed during moving image photographing.

2-3. Individual Photographing Service

As described above, the group service of the present system 1 can collectively set the others than the members of the group of the user as deletion targets in moving image photographing, for example. Alternatively or additionally to such a group service, the present system 1 may provide an individual photographing service that can individually designate a deletion target (see FIG. 5). The individual photographing service of the present system 1 will be described with reference to FIG. 11.

Figure 11:
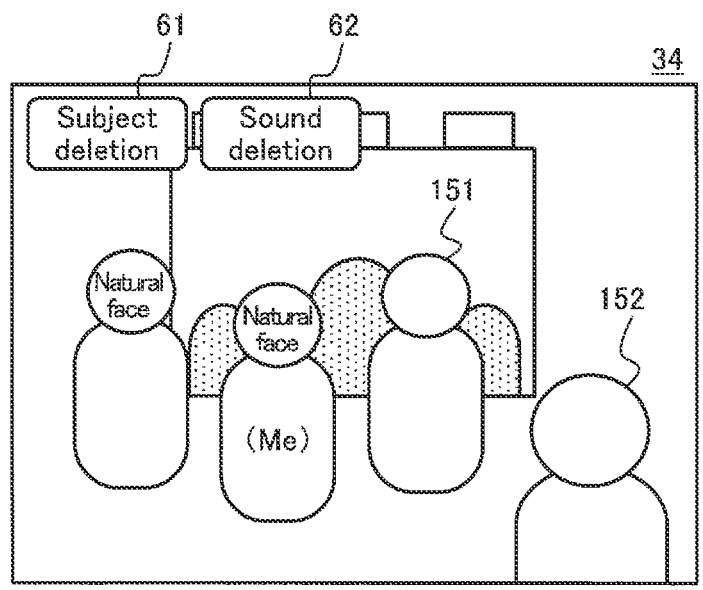
FIG. 11 is a diagram for explaining an individual photographing service of the virtual space system.

FIG. 11 illustrates a live view during the metaverse travel when the individual photographing service is ON. In the present system 1, for example, the controller 21 sets execution propriety of each of subject deletion and sound deletion in the live view at the time of virtual travel according to ON/OFF of "subject deletion" and "sound deletion" in reception information (FIG. 11) of the individual photographing service. In the example of FIG. 11, since both are set to be executable, a subject deletion button 61 and a sound deletion button 62 are displayed on the live view screen of the personal terminal 3.

For example, the user performs a touch operation on the subject deletion button 61 in the personal terminal 3, and then further performs a touch operation to designate an object desired to be a subject deletion target on the live view screen. Then, the controller 21 acquires such an operation result from the personal terminal 3, and causes the image processor 21a to delete the designated object, for example, as in step S37 in FIG. 9.

After performing a touch operation on the sound deletion button 62 on the personal terminal 3, the user further performs a touch operation to designate an object to be a sound deletion target on the live view screen. Then, the controller 21 acquires such an operation result from the personal terminal 3, and causes the audio processor 21b to delete the sound of the designated object, for example, as in step S39 in FIG. 9. The controller 21 may perform identification display of a sound deletion target on the live view screen, for example, in response to the operation of the sound deletion button 62, as in step S40.

In the present system 1, the translucent processing may be performed in the individual photographing service as in steps S32 to S34 of the group photographing processing (FIG. 9). In the individual photographing service of the present system 1, also in the translucent processing (S32 to S34), the target of the translucent display may be individually designated by the user operation of the personal terminal 3.

In the subject deletion by the subject deletion button 61, the system 1 may also simultaneously delete the sound of the object deleted on the image. Furthermore, a return instruction may be given for the sound of the deleted object.

Furthermore, an icon 60 similar to that in FIG. 10D may be displayed on an object that is not a target of sound deletion but is a target of subject deletion. Additionally or alternatively to this, identification display (e.g., a musical note mark) indicating that the sound source is located may be performed. For example, in a case where the reflection of the guide 12 is unnecessary but the user wants to listen to the sound, the guide 12 is the subject deletion target but can be excluded from the sound deletion target.

In the present system 1, the user operation for instructing execution of subject deletion/sound deletion is not limited to the example described above. For example, in the individual photographing service, an upward/downward flick operation or the like may be used instead of the above-described touch operation on the subject deletion button 61/sound deletion button 62, or a user operation such as a line-of-sight input may be used.

3. Summary

As described above, in the present embodiment, each of the virtual space server 2 and the personal terminal 3 is an information processing apparatus that displays an image in the virtual space 10 in which the avatar indicating the user moves on the display 34 for the user. An information processing apparatus (2, 3) includes: an input interface (23, 33) that receives, from among objects arranged in a virtual space 10, a user operation of setting a specific object to a target of predetermined image processing; and a controller (21, 31) that causes a display 34 to display an image obtained by applying the image processing to the specific object in the virtual space 10 on the basis of the user operation. According to such an information processing apparatus, it is possible to facilitate to obtain an image according to the user's intention in the virtual space 10.

In the information processing apparatus according to the present embodiment, in the predetermined image processing, an image subjected to the image processing is made different from an image in which a specific object is photographed in the real world according to a user operation. For example, the predetermined image processing is processing of deleting or blurring a specific object set by a user operation on an image subjected to the image processing. As a result, for example, it is possible to capture an image that is difficult to capture in the real world and to facilitate to obtain an image according to the user's intention in the virtual space 10.

Furthermore, each of the virtual space server 2 and the personal terminal 3 in the present embodiment is an example of an information processing apparatus that causes the speaker 37, which is an example of an output interface for the user, to output sound in the virtual space 10 in which the avatar indicating the user moves. The information processing apparatus includes an input interface that receives a user operation of setting a specific object as a target of predetermined audio processing among objects arranged in the virtual space 10, and a controller that causes an output interface to output sound obtained by performing audio processing on sound from the specific object in the virtual space 10 on the basis of the user operation. According to such an information processing apparatus, it is possible to facilitate to obtain sound according to the user's intention in the virtual space 10.

In the information processing apparatus according to the present embodiment, the predetermined audio processing may suppress sound from a specific object set by a user operation. In the information processing apparatus according to the present embodiment, in the predetermined audio processing, at least one of the volume and the characteristic of the sound from the specific object may be changed according to the user operation. As a result, sound collection that is difficult in the real world can be performed, and sound according to the user's intention can be easily obtained in the virtual space 10. In the predetermined audio processing, sound subjected to the audio processing may be made different from the sound collected from a specific object in the real world according to a user operation.

In the information processing apparatus of the present embodiment, the predetermined audio processing may change the sound uttered from the avatar according to the appearance of the avatar. As a result, the user can use the sound corresponding to the avatar in the virtual space 10, and convenience of the virtual space 10 can be improved.

In the information processing apparatus of the present embodiment, a user operation includes an operation of setting a group including the user and other members. The specific object includes an object other than a member of the group. As a result, predetermined image processing and audio processing can be performed for others than the members of the group of the user, and the viewing experience in the group of the user in the virtual space 10 can be easily made intended.

In the information processing apparatus according to the present embodiment, the user operation further includes an operation of selecting an object that is not a target of image processing and audio processing among objects other than the group members. As a result, even among the objects other than the group members, an object intended by the user can be excluded from the targets of the image processing and the audio processing, resulting in facilitating to obtain the experience intended by the user.

In the information processing apparatus of the present embodiment, regarding the avatar indicating the user, the controller manages the real name of an example of the first name displayed on the display 34 for the members of the group and the nickname of an example of the second name different from the first name displayed on the display 34 for the other users than the members of the group. As a result, the user experience in the group can be improved while ensuring the privacy of the user outside the group.

In the information processing apparatus of the present embodiment, the avatar indicating the user has a natural face as an example of the first appearance displayed on the display 34 for the members of the group and a second appearance different from the first appearance displayed on the display 34 for the other users than the members of the group. As a result, the user experience in the group can be improved while ensuring the privacy of the user outside the group.

In the information processing apparatus of the present embodiment, the user operation includes an operation of selecting an object to be subjected to image processing and audio processing in the object in the virtual space 10. As a result, the user can individually designate an object to be a target of image processing or audio processing, and can easily obtain viewing in the virtual space 10 according to the user's intention.

In the information processing apparatus of the present embodiment, the user operation includes an operation of requesting a predetermined service in a metaverse travel which is an example of a travel in which the avatar goes around a place in the virtual space 10. According to the information processing apparatus of the present embodiment, it is possible to improve the user experience in the metaverse travel.

In the information processing apparatus of the present embodiment, the user operation includes an operation of requesting a guide that guides a metaverse travel in which the avatar goes around a place in the virtual space 10. The audio processing causes the output interface to output the voice of the guide during the travel. As a result, the user can perform the metaverse travel while listening to the sound of the guide, and the user experience can be improved.

In the information processing apparatus of the present embodiment, the controller specifies position information indicating a predetermined place in the virtual space 10, and causes the display 34 to display an image after the avatar moves to the place on the basis of the position information. By the warp movement using such position information, for example, it is possible to facilitate gathering in accordance with the schedule in the metaverse travel, and the user experience in the virtual space 10 can be improved.

In the present embodiment, in the virtual space server 2 as the information processing apparatus, the controller 21 executes predetermined image processing to generate an image obtained by applying the image processing to a specific object, and/or executes predetermined audio processing to generate sound obtained by applying the audio processing to sound from the specific object. With such a virtual space server 2, it is possible to facilitate an experience in the virtual space 10 according to the intention of the user.

In the present embodiment, the personal terminal 3 as the information processing apparatus further includes a communication interface 35 that performs data communication with the virtual space server 2 as an example of an external apparatus that executes predetermined image processing and/or predetermined audio processing. The controller 31 acquires an image obtained by applying image processing to a specific object and/or acquires sound obtained by applying audio processing to sound from the specific object via the communication interface 35 from the external apparatus. With such a personal terminal 3, it is possible to easily obtain an experience in the virtual space 10 according to the intention of the user.

In the present embodiment, an information processing method of displaying an image in the virtual space 10 in which the avatar indicating the user moves on the display 34 for the user is provided. This method includes a step of receiving a user operation of setting a specific object to a target of predetermined image processing from among objects arranged in the virtual space 10, and a step of causing the display 34 to display an image obtained by applying the image processing to the specific object in the virtual space 10 on the basis of the user operation. As a result, it is possible to easily obtain an image according to the user's intention in the virtual space 10.

In the present embodiment, there is provided an information processing method of outputting sound in the virtual space 10 in which an avatar indicating a user moves, from an output interface for the user. This method includes a step of receiving a user operation of setting an object to be subjected to predetermined audio processing among objects arranged in the virtual space 10, and a step of outputting, from an output interface, sound obtained by applying the audio processing to sound from the object set in the virtual space 10 on the basis of the user operation, thereby making it easy to obtain sound according to the user's intention in the virtual space 10.

In the present embodiment, a program for causing a controller to execute each of the above-described information processing methods is provided. As a result, it is possible to facilitate an experience such as viewing according to the user's intention in the virtual space 10.

Second Embodiment

Hereinafter, a second embodiment of the present disclosure will be described with reference to FIGS. 12A to 13. In the first embodiment, the operation example using the position information for the warp movement service has been described. In the second embodiment, an operation example using a line-of-sight input for the warp movement service will be described.

Hereinafter, description of the same configuration and operation as those of the virtual space system 1 according to the first embodiment will be omitted as appropriate, and a virtual space system 1 according to the present embodiment will be described.

In the virtual space system 1 of the present embodiment, for example, a line-of-sight of the user is detected by capturing an image including the user's eyes using the camera 38 of the personal terminal 3. The camera 38 is an example of a detector in the personal terminal 3 of the present embodiment.

For example, an infrared light camera is used as the camera 38, and the controller 31 detects the line of sight of the user by performing image recognition of a corneal reflex method. According to the corneal reflex method, the line-of-sight can be detected by image recognition of the positional relationship between the reflected light of the infrared light source and the pupil in the cornea. The camera 38 may be a visible light camera, and may detect the line of sight by, for example, image recognition of a positional relationship between an inner corner of the eye and an iris instead of the corneal reflex method. Furthermore, an external camera 38 such as a camera 38 in the HMD external to the personal terminal 3 may be used. In this case, the communication interface of the personal terminal 3 is an example of the detector that acquires the captured image of the camera 38.

Figure 12A:
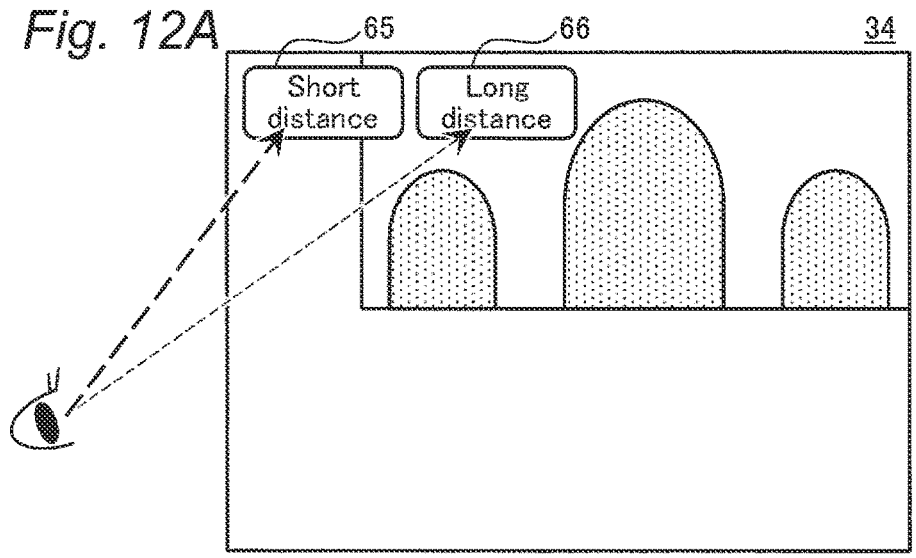
FIGS. 12A to 12C are diagrams for explaining a warp movement service according to a second embodiment.
Figure 12B:
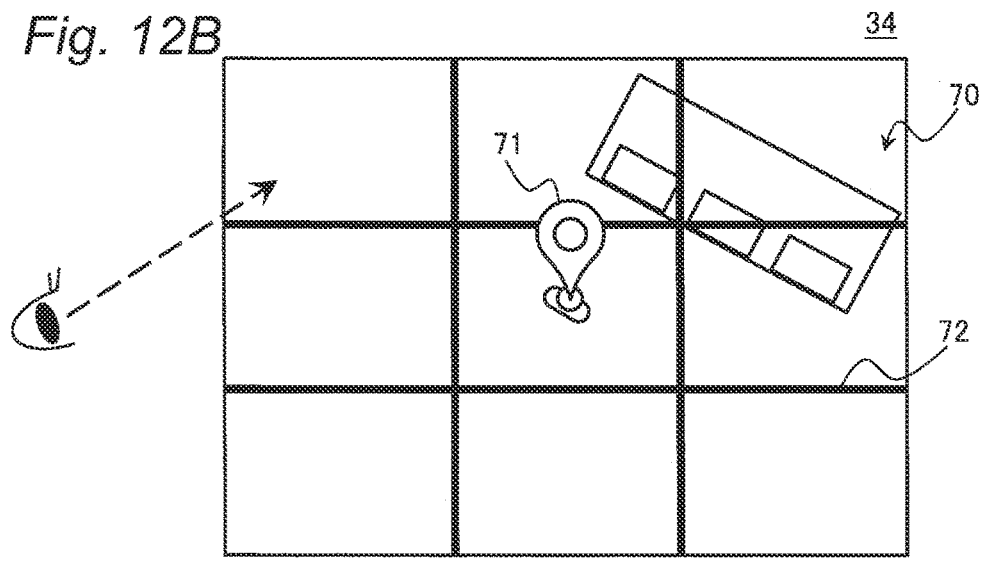
Figure 12C:
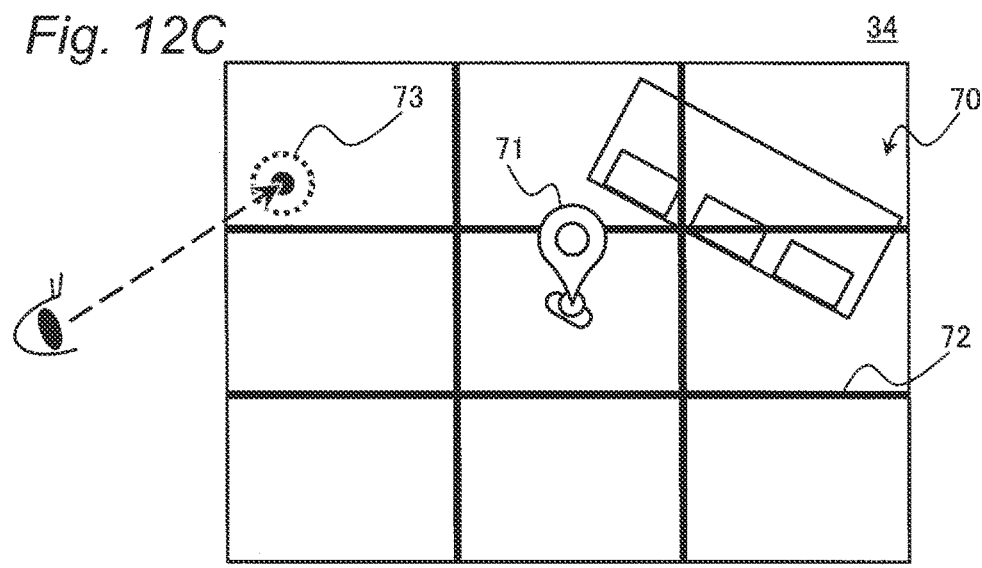

FIGS. 12A to 12C are diagrams for describing a modification of the warp movement service of the present embodiment. FIG. 13 is a flowchart illustrating an operation of such a warp movement service.

FIG. 12A illustrates a live view when the warp movement service of a line-of-sight input is ON. In the present example, the display 34 of the personal terminal 3 displays a short distance button 65 and a long distance button 66 for warp movement of the line-of-sight input.

Figure 13:
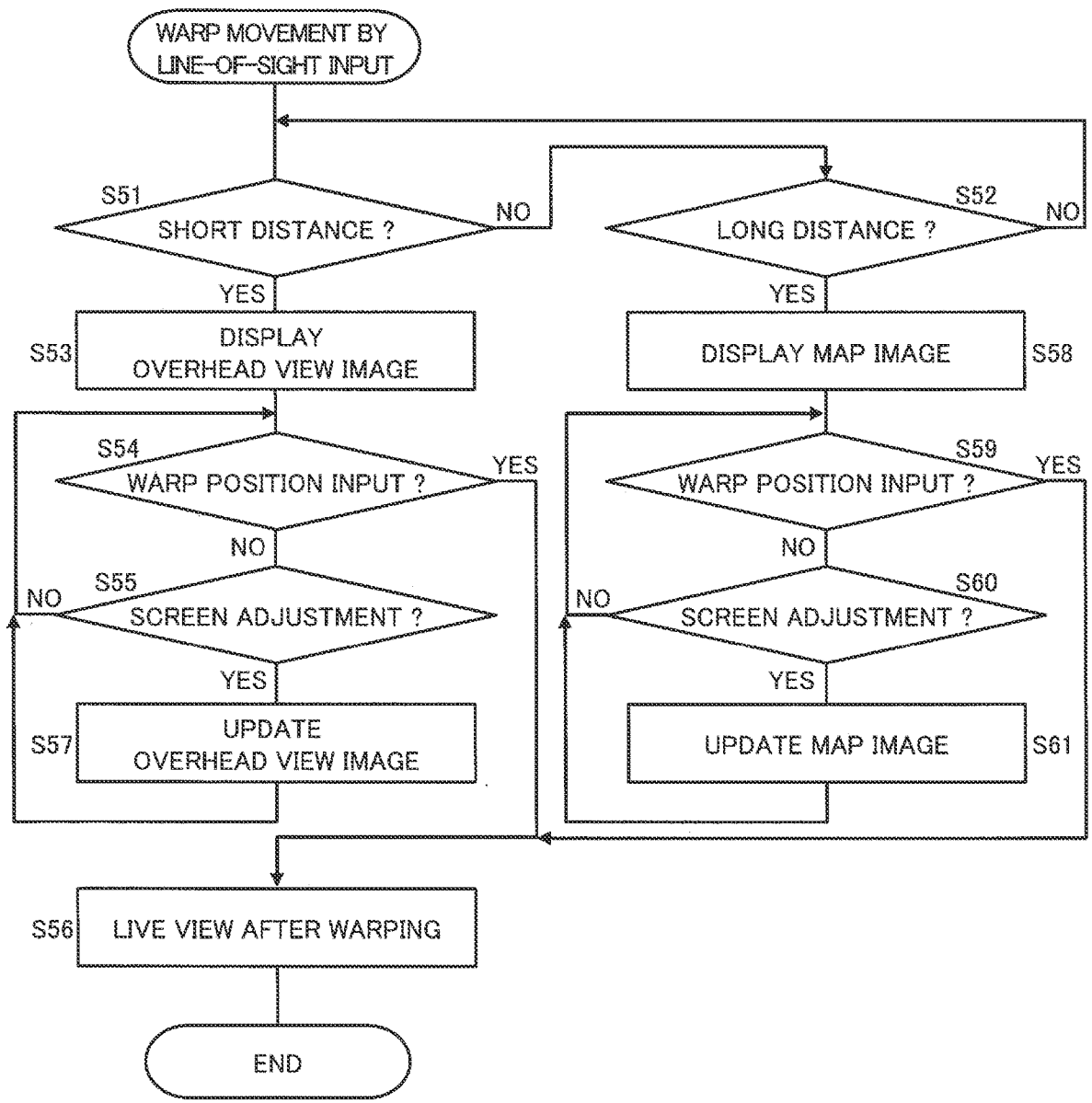
FIG. 13 is a flowchart illustrating an operation of the warp movement service according to the second embodiment.

For example, in the flow of FIG. 13, the controller 31 of the personal terminal 3 detects a line-of-sight input in which the user gazes at the short distance button 65 (S51), and detects a line-of-sight input in which the user gazes at the long distance button 66 (S52). For example, when detecting a line-of-sight gazing at the same portion on the screen of the display 34 for a predetermined period (e.g., several seconds) or more, the controller 31 detects the gaze as a line-of-sight input. When the line-of-sight input of each of the buttons 65 and 66 is not detected (NO in S51 and S52), the controller 31 repeats the processing of steps S51 and S52.

When the line-of-sight input of the short distance button 65 is detected (YES in S51), the controller 31 switches the live view of the display 34 to the screen for warp movement at a short distance and displays the screen (S53). In the warp movement at a short distance, for example, an image of the virtual space 10 viewed from above is used. The display example of step S53 is illustrated in FIG. 12B.

In step S53, as illustrated in FIG. 12B, for example, the display 34 of the personal terminal 3 displays an overhead view image 70 of the virtual space 10, a current position marker 71 indicating the current position of the avatar 15 of the user, and a grid frame 72 that divides the overhead view image 70 into regions.

For example, in step S53, the controller 31 of the personal terminal 3 performs data communication with the virtual space server 2 to acquire image data of the overhead view image 70. During such a warp movement service, the controller 21 of the virtual space server 2 acquires various information from the personal terminal 3, causes the image processor 21a to generate required image data in a timely manner, and transmits the image data to the personal terminal 3.

For example, while the screen of FIGS. 12A to 12C are displayed, the controller 31 detects a line-of-sight input for designating the position of the warp destination (S54) and detects various line-of-sight inputs for adjusting the screen display (S55).

For example, when the user continues to gaze at a position desired to move on the overhead view image 70, the controller 31 detects such a line-of-sight input (YES in S54). According to the screen display of FIG. 12B, since the overhead view image 70 is divided into regions by the grid frame 72, the user can easily direct the line-of-sight to a region in a desired frame with reference to the grid frame 72, and can facilitate to designate the position of the warp destination by the line-of-sight input.

During the detection in step S54, the controller 31 displays a warp marker 73 indicating the warp movement destination at a position corresponding to the user's line-of-sight on the overhead view image 70, for example, as illustrated in FIG. 12C. For example, when the user continues to gaze at the displayed warp marker 73, the controller 31 determines the line-of-sight input for designating the position of the warp destination, and proceeds to YES in step S54.

When the line-of-sight input for designating the position of the warp destination is detected (YES in S54), for example, the controller 31 of the personal terminal 3 transmits, to the virtual space server 2, an instruction to move the user's own avatar 15 to the position of the warp marker 73 (S56). The controller 31 acquires, from the virtual space server 2, image data and the like in a state where the user's own avatar 15 has moved to the position of the warp marker 73, and causes the display 34 to display the live view after warping (S56).

The line-of-sight input (S55) for adjusting the screen display for warp movement at a short distance as illustrated in FIG. 12B is, for example, scrolling and enlargement/reduction of the overhead view image 70 in the vertical and horizontal directions. For example, the line-of-sight input of scrolling is performed by directing a line-of-sight to each end portion in the vertical and horizontal directions from the screen center of the display 34. The line-of-sight input for enlargement/reduction is performed by, for example, directing a line-of-sight at a predetermined portion such as an upper right corner or a lower right corner on the screen.

When detecting various line-of-sight inputs for screen adjustment (YES in S55), the controller 31 requests the overhead view image 70 adjusted by the detected line-of-sight input from the virtual space server 2, and updates the screen display on the display 34 (S57). Thereafter, the controller 31 performs the processing of step S54 and subsequent steps again in the updated screen display.

When the line-of-sight input of the long distance button 66 is detected (YES in S52), the controller 31 switches the live view of the display 34 to the screen for warp movement at a long distance and displays the screen (S58). In the warp movement at a long distance, for example, an image indicating a map of the virtual space 10 is used instead of the overhead view image 70 in a display configuration similar to the screen for warp movement at a short distance described above.

For example, the controller 31 detects a line-of-sight input for designating the position of the warp destination as in step S54 (S59) or detects various line-of-sight inputs for screen adjustment as in step S55 (S60) during screen display for such warp movement at a long distance. At this time, by using the map image of the virtual space 10, the user can easily designate a distant position more accurately and quickly in the virtual space 10 than at the time of warp movement at a short distance (FIG. 12B).

When detecting various line-of-sight inputs for screen adjustment for warp movement at a long distance (YES in S60), the controller 31 requests a map image after adjustment instead of the overhead view image 70 in step S57 from the virtual space server 2, and updates the screen display on the display 34 (S61). When detecting the line-of-sight input with the position designation for the warp movement at a long distance (YES in S59), the controller 31 warps the user's own avatar 15 and displays the live view on the display 34 (S56), similarly to the case of the warp movement at a short distance (YES in S54).

The controller 31 of the personal terminal 3 ends the processing illustrated in this flow by the live view display (S56) after the warp movement. Thereafter, the controller 31 repeats the processing of this flow at a predetermined cycle, for example.

According to the above processing, the present system 1 can facilitate to perform the warp movement desired by the user in the virtual space 10, for example, by detecting the line-of-sight input of the user in the personal terminal 3.

As described above, as the information processing apparatus of the present embodiment, for example, the personal terminal 3 further includes the camera 38 as an example of a detector that detects the line-of-sight of the user. The controller 31 moves the avatar to a position separated from the current position in the virtual space 10 on the basis of the line-of-sight detected by the detector (S56). As a result, the user can warp and move in the virtual space 10 by the line-of-sight input, and the convenience of the user in the present system 1 can be improved.

The various processing described above may be performed not only by the controller 31 of the personal terminal 3 but also by the controller 21 of the virtual space server 2. For example, the controller 21 may perform the image recognition of the line-of-sight input by acquiring the captured image of the camera 38 from the personal terminal 3 via the communication interface 23. The communication interface 23 of the virtual space server 2 is an example of a detector in the virtual space server 2 as the information processing apparatus of the present embodiment.

Other Embodiments

As described above, the first and second embodiments have been described as examples of the technology disclosed in the present application. However, the technology in the present disclosure is not limited to this, and can also be applied to embodiments in which changes, substitutions, additions, omissions, and the like have been made as appropriate. In addition, it is also possible to combine the components described in the above embodiments to form a new embodiment.

In the first embodiment described above, an example has been described in which image processing of deleting a subject desired by a user on an image is performed in the virtual space system 1, but the present embodiment is not limited thereto. For example, the virtual space server 2 of the present embodiment may perform processing of blurring a subject desired by the user on the image of the virtual space 10 as image processing instead of the deletion of the subject in step S37 of FIG. 9, for example. Such image processing can be realized using, for example, the technology disclosed in Patent Document 1. Even with such image processing, it is possible to facilitate to obtain an image according to the user's intention in the virtual space 10 as in the above-described embodiment.

In the above-described embodiments, an example has been described in which predetermined image processing and audio processing are performed in moving image photographing in the virtual space system 1, but the present embodiment is not limited thereto. For example, the present system 1 may perform image processing similar to that of each of the above embodiments in still image photographing. For example, the virtual space server 2 may perform image processing of deleting or blurring a subject in response to an operation of designating the subject that the user does not want to show in the ceremonial photographing during the metaverse travel. The present system 1 may apply predetermined image processing or the like particularly other than at the time of photographing a moving image or a still image.

In the above embodiments, the deletion processing and the blurring processing are exemplified as the predetermined image processing, but the present embodiment is not limited thereto, and various image processing may be performed on an object as a subject. For example, when an image is captured in the tourist spot 11 (FIG. 1) of the virtual space 10, image processing of changing a relative scale between various objects of the tourist spot 11 and the avatar 15 may be performed. As a result, it is possible to easily realize image photographing such as trick art photographing in the real world using the virtual space 10, and it is possible to facilitate to obtain an image according to the user's intention in the virtual space 10.

Further, in the above embodiments, the application example of the metaverse travel in the virtual space system 1 has been described, but the present embodiment is not limited thereto. The present system 1 is applicable to an application for obtaining at least one of an image and sound for various experiences of a user in a virtual space.

For example, the present system 1 may perform audio processing of suppressing the voice of the audience in live viewing such as a performance or a lecture of a famous person in the virtual space 10. At this time, the audience may remain displayed on the image, or image processing of deleting the display of the audience may be performed. Furthermore, audio processing for suppressing other sounds may be performed while only a specific instrument performance or a specific person's voice is left. In the present system 1, only sound recording is performed, an image does not need to be recorded, and an image does not need to be displayed only by sound output.

As described above, the embodiments have been described as examples of the technology in the present disclosure. For this purpose, the accompanying drawings and detailed description are provided. Therefore, the components described in the accompanying drawings and the detailed description may include not only components essential for solving the problem but also components that are not essential for solving the problem in order to illustrate the above technique.

Summary of Aspects

Hereinafter, various aspects according to the present disclosure will be additionally described.

A first aspect according to the present disclosure is an information processing apparatus that causes a display for a user to display an image in a virtual space in which an avatar indicating a user moves, the information processing apparatus including: an input interface that receives a user operation of setting a specific object to a target of predetermined image processing among objects arranged in the virtual space; and a controller that causes the display to display an image in which the image processing has been applied to the specific object in the virtual space on the basis of the user operation.

According to a second aspect, in the information processing apparatus according to the first aspect, in the predetermined image processing, an image to which the image processing has been applied is made different from an image in which a specific object is photographed in a real world according to a user operation.

According to a third aspect, in the information processing apparatus according to the first or second aspect, the predetermined image processing is processing of deleting or blurring a specific object set by a user operation on an image on which the image processing has been performed.

A fourth aspect is an information processing apparatus that causes an output interface for a user to output sound in a virtual space in which an avatar indicating the user moves, the information processing apparatus including: an input interface that receives a user operation of setting a specific object to a target of predetermined audio processing among objects arranged in the virtual space; and a controller that causes the output interface to output sound in which the audio processing has been applied to the sound from the specific object in the virtual space on the basis of the user operation.

According to a fifth aspect, in the information processing apparatus according to the fourth aspect, the predetermined audio processing suppresses sound from a specific object set by a user operation.

According to a sixth aspect, in the information processing apparatus according to the fourth or fifth aspect, the predetermined audio processing changes at least one of volume and characteristic of sound from a specific object according to a user operation.

According to a seventh aspect, in the information processing apparatus according to any one of the fourth to sixth aspects, the predetermined audio processing changes sound uttered from the avatar according to the appearance of the avatar.

According to an eighth aspect, in the information processing apparatus according to any one of the first to seventh aspects, the user operation includes an operation of setting a group including a user and other members, and the specific object includes an object other than the members of the group.

According to a ninth aspect, in the information processing apparatus according to the eighth aspect, the user operation further includes an operation of selecting an object that is not a target of image processing and/or audio processing among objects other than the members of the group.

According to a tenth aspect, in the information processing apparatus according to any one of the first to ninth aspects, regarding the avatar indicating the user, the controller manages a first name displayed on the display for the members of the group and a second name different from the first name displayed on the display for the persons other than the members of the group.

According to an eleventh aspect, in the information processing apparatus according to any one of the first to tenth aspects, the avatar indicating the user has a first appearance displayed on the display for the members of the group and a second appearance different from the first appearance displayed on the display for the persons other than the members of the group.

According to a twelfth aspect, in the information processing apparatus according to any one of the first to eleventh aspects, the user operation includes an operation of selecting an object that is a target of image processing and/or audio processing among objects in the virtual space.

According to a thirteenth aspect, in the information processing apparatus according to any one of the first to twelfth aspects, the user operation includes an operation of requesting a predetermined service in a travel in which the avatar goes around a place in the virtual space.

According to a fourteenth aspect, in the information processing apparatus according to any one of the first to thirteenth aspects, the user operation includes an operation of requesting a guide that guides a travel in which the avatar goes around a place in the virtual space, and the audio processing causes an output interface to output sound of the guide during the travel.

According to a fifteenth aspect, in the information processing apparatus according to any one of the first to fourteenth aspects, the controller specifies position information indicating a predetermined place in the virtual space, and causes the display to display an image after the avatar moves to the place on the basis of the position information.

According to a sixteenth aspect, the information processing apparatus according to any one of the first to fifteenth aspects further includes a detector that detects a line-of-sight of the user, and the controller moves the avatar to a position separated from the current position in the virtual space on the basis of the line-of-sight detected by the detector.

According to a seventeenth aspect, in the information processing apparatus according to any one of the first to sixteenth aspects, the controller executes predetermined image processing to generate an image in which image processing has been applied to a specific object, and/or executes predetermined audio processing to generate sound in which audio processing has been applied to sound from a specific object.

According to an eighteenth aspect, the information processing apparatus according to any one of the first to sixteenth aspects further includes a communication interface that performs data communication with an external apparatus that executes predetermined image processing and/or predetermined audio processing, and the controller acquires, from the external apparatus via the communication interface, an image in which the image processing has been applied to a specific object, and/or sound in which the audio processing has been applied to sound from the specific object.

A nineteenth aspect is an information processing method for displaying an image in a virtual space in which an avatar indicating a user moves on a display for the user, the method including the steps of: receiving a user operation of setting a specific object to a target of predetermined image processing among objects arranged in the virtual space; and displaying, on the display, an image in which the image processing has been applied to the specific object in the virtual space on the basis of the user operation.

A twentieth aspect is an information processing method for outputting, from an output interface for a user, sound in a virtual space in which an avatar indicating the user moves, the method including the steps of: receiving a user operation of setting an object that is a target of predetermined audio processing, among objects arranged in the virtual space; and outputting, from the output interface, sound in which the audio processing has been applied to sound from the object set in the virtual space, on the basis of the user operation.

A twenty-first aspect is a program for causing a controller to execute the information processing method according to the nineteenth or twentieth aspect.

The present disclosure is applicable to various information technologies that provide users with experience in a virtual space.

The invention claimed is:

1. An information processing apparatus for causing displays to display an image obtained in a virtual space, the displays including a first display being provided for a user and a second display different from the first display, the virtual space being configured by a three-dimensional object to allow an avatar indicating the user to move, the information processing apparatus comprising:
an input interface that receives a user operation to set a specific object from objects arranged in the virtual space, the specific object being a target for predetermined image processing among objects arranged in the virtual space; and
a controller that causes, in response to the user operation, the first display to display a processed image and the second display to display a non-processed image, the processed image being obtained by applying the image processing to a whole of the specific object in the virtual space so as to render the specific object transparent within the processed image while being maintained in the virtual space, the non-processed image maintaining the specific object non-transparent, the second display being provided for another user who does not perform the user operation and corresponds to the specific object.

2. The information processing apparatus according to claim 1, wherein the predetermined image processing is processing to delete or blur the specific object set by the user operation on the processed image.

3. The information processing apparatus according to claim 1,
wherein the user operation includes an operation to set a group of members including a member corresponding to the user,
wherein the specific object includes an object other than the members of the group.

4. The information processing apparatus according to claim 3, wherein the user operation further includes an operation to select an object that is not the target for the image processing, among objects other than the members of the group.

5. The information processing apparatus according to claim 3, wherein the controller manages a first name and a second name with respect to the avatar indicating the user, the first name displayed on the display for the members of the group and the second name being different from the first name and displayed on another display provided for other than the members of the group.

6. The information processing apparatus according to claim 3, wherein the avatar indicating the user has a first appearance and a second appearance, the first appearance displayed on the display for the members of the group and the second appearance being different from the first appearance and displayed on another display provided for other than the members of the group.

7. The information processing apparatus according to claim 1, wherein the user operation includes an operation to select an object that is the target for the image processing, among the objects in the virtual space.

8. The information processing apparatus according to claim 1, wherein the user operation includes an operation to request a predetermined service in a travel in which the avatar goes around a place in the virtual space.

9. The information processing apparatus according to claim 1,
wherein the controller
specifies position information indicating a predetermined place in the virtual space, and
causes the display to display an image obtained after the avatar moves to the place, based on the position information.

10. An information processing method for displaying an image obtained in a virtual space on displays, the displays including a first display being provided for a user and a second display different from the first display, the virtual space being configured by a three-dimensional object to allow an avatar indicating the user to move, the method comprising:
receiving a user operation to set a specific object from objects arranged in the virtual space, the specific object being a target for predetermined image processing, among objects arranged in the virtual space; and
displaying, in response to the user operation, on the first display a processed image, and a non-processed image on the second display, the processed image being obtained by applying the image processing to a whole of the specific object in the virtual space so as to render the specific object transparent within the processed image while being maintained in the virtual space, the non-processed image maintaining the specific object non-transparent, the second display being provided for another user who does not perform the user operation and corresponds to the specific object.

11. An information processing apparatus for causing output interfaces to output sound obtained in a virtual space, the output interfaces including a first output interface being provided for a user and a second output interface different from the first output interface, the virtual space being configured by a three-dimensional object to allow an avatar indicating the user to move, the information processing apparatus comprising:
an input interface that receives a user operation to set a specific object other than the avatar indicating the user as a target for predetermined audio processing, among objects arranged in the virtual space; and
a controller that causes the first output interface to output processed sound, based on the user operation, and the second output interface to output non-processed sound, the processed sound being obtained by applying the audio processing to sound that is received from the specific object for the audio processing and emitted from the specific object in the virtual space, and the non-processed sound being obtained by not applying the audio processing to the sound that is received from the specific object, the second output interface being provided for another user who does not perform the user operation and corresponds to the specific object,
wherein the user operation includes an operation to select an object that is the target for the audio processing, among the objects in the virtual space in a live view screen.

12. The information processing apparatus according to claim 11, wherein the predetermined audio processing suppresses the sound from the specific object set by the user operation.

13. The information processing apparatus according to claim 11, wherein the predetermined audio processing changes at least one of volume or characteristic of the sound from the specific object, according to the user operation.

14. The information processing apparatus according to claim 11, wherein the predetermined audio processing changes sound uttered from the avatar, according to appearance of the avatar.

15. The information processing apparatus according to claim 11,
 wherein the user operation includes an operation to set a group of members including a member corresponding to the user,
 wherein the specific object includes an object other than the members of the group.

16. The information processing apparatus according to claim 15, wherein the user operation further includes an operation to select an object that is not the target for the audio processing, among objects other than the members of the group.

17. The information processing apparatus according to claim 11,
 wherein the user operation includes an operation to request a guide that guides a travel in which the avatar goes around a place in the virtual space, and
 the audio processing causes the output interface to output sound of the guide during the travel.

18. The information processing apparatus according to claim 11,
 further comprising a detector that detects a line-of-sight of the user,
 wherein the controller moves the avatar to a position separated from a current position in the virtual space, based on the line-of-sight detected by the detector.

19. An information processing method for outputting, from output interfaces, sound obtained in a virtual space, the output interfaces including a first output interface being provided for a user and a second output interface different from the first output interface, the virtual space being configured by a three-dimensional object to allow an avatar indicating the user to move, the method comprising:
 receiving a user operation to set a specific object other than the avatar indicating the user as a target for predetermined audio processing, among objects arranged in the virtual space; and
 outputting a processed sound from the first output interface, based on the user operation, and a non-processed sound from the second output interface, the processed sound being obtained by applying the audio processing to sound that is received from the specific object for the audio processing and emitted from the specific object set in the virtual space, and the non-processed sound being obtained by not applying the audio processing to the sound that is received from the specific object, the second output interface being provided for another user who does not perform the user operation and corresponds to the specific object,
 wherein the user operation includes an operation to select an object that is the target for the audio processing, among the objects in the virtual space in a live view screen.

20. The information processing apparatus according to claim 1, wherein the processed image includes a scene based on a point of view in the virtual space, the scene in the virtual space being variable three-dimensionally in accordance with a user operation input via the input interface to change the point of view.

* * * * *